United States Patent [19]
Crespi

[11] Patent Number: 5,221,453
[45] Date of Patent: Jun. 22, 1993

[54] SILVER VANADIUM OXIDE CATHODE MATERIAL AND METHOD OF PREPARATION

[75] Inventor: Ann M. Crespi, Minneapolis, Minn.

[73] Assignee: Medtronic, Inc., Minneapolis, Minn.

[21] Appl. No.: 589,120

[22] Filed: Sep. 27, 1990

[51] Int. Cl.⁵ .................. C25B 11/06; H01M 4/04; H01M 4/54
[52] U.S. Cl. .................. 204/291; 204/242; 429/219; 429/217; 429/232; 429/122; 423/593; 502/101; 502/243; 252/182.1
[58] Field of Search .................. 204/242, 252, 291; 429/217, 219, 232, 122; 423/593; 502/101, 159, 347, 243; 252/182.1

[56] References Cited

U.S. PATENT DOCUMENTS 4,310,609  1/1982  Liang et al. .................. 429/219
4,965,151  10/1990  Takada et al. .................. 429/191

Primary Examiner—John Niebling
Assistant Examiner—Kathryn Gorgos
Attorney, Agent, or Firm—Daniel W. Latham; Harold R. Patton

[57] ABSTRACT

Improved high rate cathode material and method of making same by chemical addition reaction.

11 Claims, 3 Drawing Sheets

SILVER VANADIUM OXIDE CATHODE MATERIAL AND METHOD OF PREPARATION

BACKGROUND

This invention relates to high energy and high power density electrochemical cells and more particularly to an improved silver vanadium oxide material and its preparation for use as a cathode material in such cells.

Silver vanadium oxide (SVO) is generally already known and used in batteries. Its preparation for use in batteries by means of a decomposition reaction is also well known. See U.S. Pat. No. 4,310,609 and U.S. Pat. No. 4,391,729.

In the latter patents, the decomposition reaction

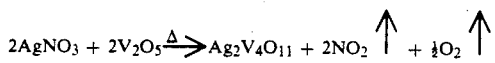

is disclosed for preparing SVO. This reaction is accompanied by the evolution of gaseous products.

It has also been suggested that SVO can be prepared by addition or combination reactions. See Liang U.S. Pat. No. 4,391,729 (col. 2, 1 35–37); Etudes sur les systemes V-Ag-O et V-Cu-O, par Bernard Raveau, "Revue de Chimie minerale, t.4, 1967, p. 729.; No. 668. - Sur quelques nouvelles phases non-stoechiometriques du systeme $Ag_2O$-$V_2O_5$-$VO_2$. 1.-Etude chimique et cristallographique, par Andre Casalot et Michel Pouchard, "Bulletin De La Societe Chimique De France", 1967 N° 10, and Diffusion of Silver in Silver Vanadium Bronzes, B. B. Scholtens, "Mat. Res. Bull.", Vol. 11, pp. 1533-1538, 1976, Pergamon Press, Inc.

SUMMARY OF THE INVENTION

This invention provides improved SVO cathode material by means of combination or addition reactions without involving decomposition and without the evolution of gaseous product.

DETAILED DESCRIPTION OF THE PREFERRED EMBODIMENT

It has been discovered that SVO cathode material prepared by chemical combination or addition reactions provides improved cells as compared to those which use SVO prepared by the decomposition reaction described above. Additionally, the procedure for preparation is easier. The cathode material is improved in the sense that it has ben determined that such cells maintain a higher pulse voltage than do those which use SVO prepared by the decomposition reaction. Higher pulse voltage leads to shorter charge time and longer cell life when used in devices such as cardiac defibrillators.

For example, in reactant mole ratios of 1:2 the following addition reaction produces $Ag_2V_4O_{11}$, in an oxidizing atmosphere:

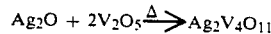

The following addition reaction also produces $Ag_2V_4O_{11}$, in an oxidizing atmosphere:

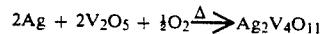

The addition reaction of silver vanadate ($AgVO_3$) and vanadium pentoxide ($V_2O_5$) in a 2:1 mole ratio yields $Ag_2V_4O_{11}$ or $Ag_2V_4O_{11-y}$, where y varies =0.25–0.35, depending on reaction conditions, i.e. oxidizing or inert atmospheres:

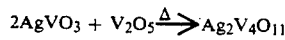

These addition reactions, at preferred heating temperatures of about 520° C., will proceed to complete reaction of the constituents within about 5–24 hours at temperature. An optimal temperature range is about 450° C. to about 550° C., although particular temperatures are not critical and may vary over wide ranges such as between 300° C. to 700° C. Lower temperatures require longer reaction time. Once the reaction is completed, the material may be held at temperature indefinitely, although undesirable grain growth may occur. Longer times and higher temperatures may lead to diminished rate capability in cells. Generally, lower temperatures are preferred in order to limit grain growth in the reaction product.

Mixing of the reactants in the ratios specified is preferred although an excess of either initial reactant may be used. However, in such instances, the result is a mixture which is difficult to separate. However, one may wish to use a non-stoichiometric mixture.

EXAMPLES $AgVO_3$ and $V_2O_5$ powders in a 2:1 mole ratio were milled together and heated at 520° C. under a flowing argon atmosphere (to make $Ag_2V_4O_{11-y}$) and under a flowing oxygen atmosphere (to make $Ag_2V_4O_{11}$). $Ag_2O$ and $V_2O_5$ powders in a 1:2 mole ratio were also milled and heated under the same conditions to produce the same products. The resultant products were mixed with carbon black (conductive material) and Teflon (binder) and incorporated into high-rate test cells.

Figure 1:
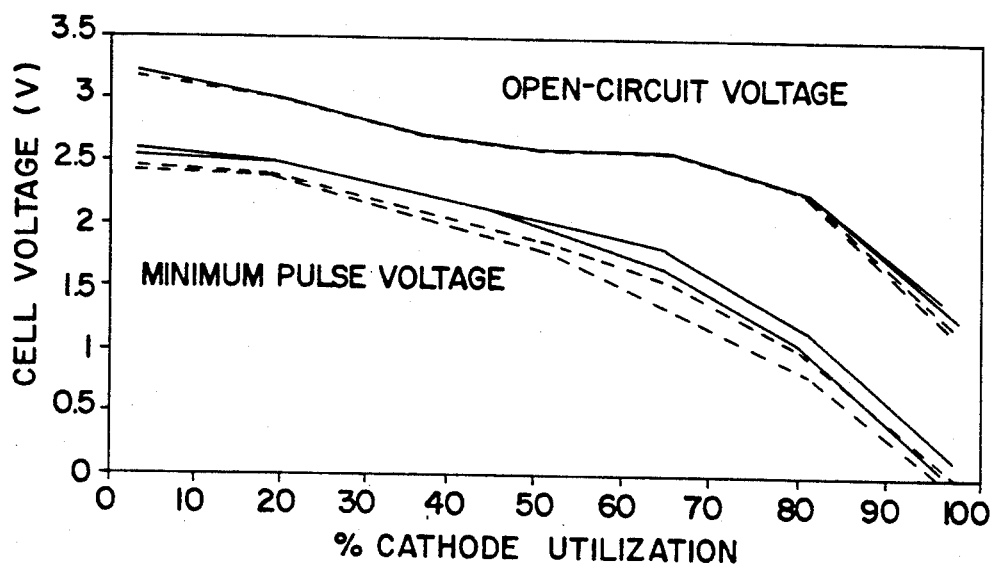
FIGS. 1 and 2 are graphs comparing open-circuit voltage and a pulse voltage for test cells using cathode material of the invention (FIG. 1) and material of the prior art (FIG. 2.).
Figure 2:
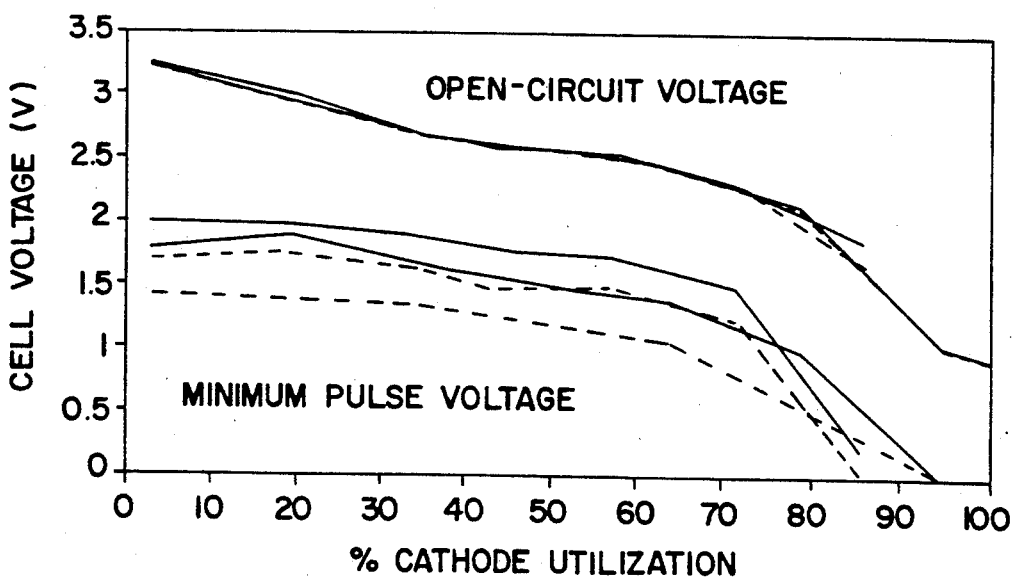

The test cells were constructed from small rectangular strips of cathode material (4 cm² each side) which were sandwiched between plates of lithium and fitted into a case which was filled with electrolyte. The electrolyte was a 1:1 volume mixture of propylene carbonate and diglyme containing 1M. lithium perchlorate ($LiClO_4$). A separator of porous polypropylene was included between the lithium plates and the cathode material. Similar test cells using cathode material prepared by the prior art decomposition reaction were also prepared. The cells were discharged at 63 μA/cm². Periodically, the discharge was interrupted. The cells were then allowed to rest on open-circuit prior to a high current pulse. The open-circuit voltage immediately prior to the pulse appears in the upper traces in FIGS. 1 and 2. The cells were then pulsed at current densities of 12 or 19 mA/cm². Two cells were pulsed at each current density. The pulses were terminated when 0.25 J/cm² of energy had been delivered. The lower traces represent the minimum voltage achieved during the pulse. FIG. 1 shows the relationship of minimum pulse voltage to open-circuit voltage for cathode material of the invention. FIG. 2 shows the same data for that of the decomposition type. It can be readily seen in FIG. 1 that the material of the invention provides a surprisingly smaller difference between open-circuit voltage and minimum pulse voltage than does the material in FIG. 2.

Figure 3A:
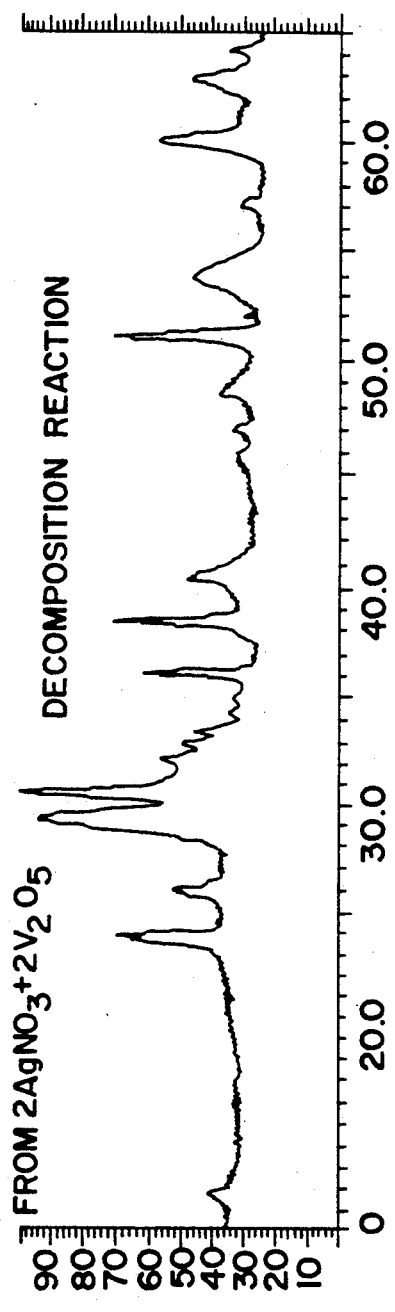
FIG. 3 is a group of X-ray diffraction patterns of prior art cathode material (3a) and material of the invention (3b and 3c).
Figure 3B:
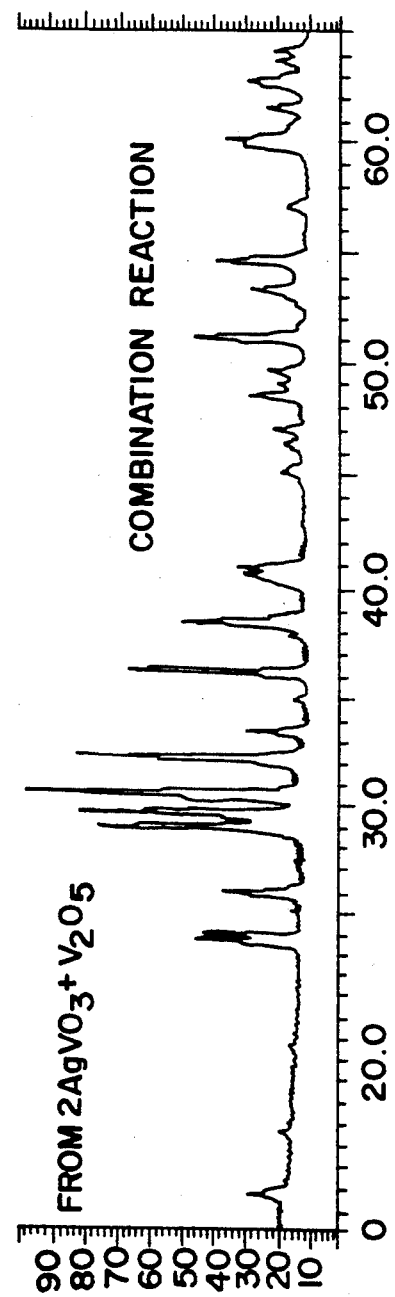
Figure 3C:
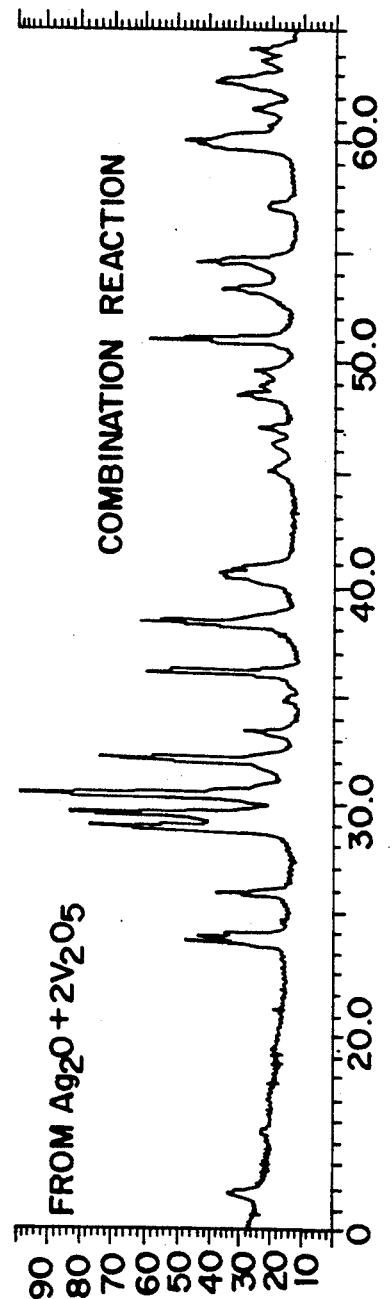

FIG. 3a is an X-ray diffraction pattern of $Ag_2V_4O_{11}$ made from $AgNO_3$ and $V_2O_5$ (decomposition reaction). FIGS. 3b and 3c are X-ray diffraction patterns of $Ag_2V_4O_{11}$ synthesized by the two combination reactions, as shown on the plots. Plots 3b and 3c are essentially identical, but Plot 3a has a higher background level, indicating lower crystallinity of material. Although the peaks are in the same position in all the plots, they are sharper in 3b and 3c than in 3a, and in some cases two distinct peaks appear in 3b and 3c where one broad peak appeared in 3a. These observations all indicate a higher degree of crystallinity in 3b and 3c than in 3a, which is surprising because high crystallinity is often associated with low rate capability in metal oxide cathodes.

With respect to the heating atmosphere for reaction, nitrogen, helium ad other inert atmospheres may be used in place of argon and other oxidizing atmospheres such as air may be used in place of oxygen.

Other binders may be used in making the cathode material. For example, methyl cellulose, ethylene propylene diene terpolymer (EPDM), polyethylene, polypropylene and fluorinated ethylene propylene (FEP) may be used with or without carbon black conductive material. Teflon may be used alone. Also, graphite may be used in place of or in addition to carbon black.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for making an electrochemical cell having the steps of: admixing silver vanadium oxide with a conductive material and a binder and forming the admixture into a cathode; combining the cathode with a lithium metal anode; and combining an electrolyte with the anode and cathode, the method consisting of: preparing the silver vanadium oxide by a chemical addition reaction consisting of admixing $AgVO_3$ and $V_2O_5$ in a 2:1 mole ratio heating the admixed $AgVO_3$ and $V_3O_5$ at a reaction temperature in the range of 300° C. to 700° C. for 5 to 24 hours.

2. The method of claim 1 wherein the $AgVO_3$ and $V_2O_5$ are in powder form.

3. A method for making an electrochemical cell having the steps of: admixing silver vanadium oxide with a conductive material and a binder and forming the admixture into a cathode; combining the cathode with a lithium metal anode; and combining an electrolyte with the anode and cathode, the method consisting of: preparing the silver vanadium oxide by a chemical addition reaction consisting of admixing $Ag_2O_5$ and $V_2O_5$ in a 1:2 mole ratio heating the admixed $Ag_2O$ and $V_2O_5$ at a reaction temperature in the range of 300° C. to 700° C. for 5 to 24 hours.

4. The method of claim 3 wherein the $Ag_2O$ and $V_2O_5$ are in powder form.

5. The method of claim 1 or 3 wherein the heating step takes place in an inert atmosphere.

6. The method of claim 1 or 3 wherein the heating step takes place in an oxidizing atmosphere.

7. A method for making an electrochemical cell having the steps of: admixing silver vanadium oxide with a conductive material and a binder and forming the admixture into a cathode; combining the cathode with a lithium metal anode; and combining an electrolyte with the anode and cathode, the method consisting of: preparing the silver vanadium oxide by a chemical addition reaction consisting of: admixing Ag and $V_2O_5$ in a 1:1 mole ratio heating the admixed Ag and $V_2O_5$ in contact with oxygen at a reaction temperature in the range of 300° C. to 700° C. for 5 to 24 hours.

8. The method of claim 7 wherein the Ag and $V_2O_5$ are in powder form.

9. The method of claim 1, 3 or 7 wherein admixing is accomplished by milling.

10. An electrochemical cell having a lithium metal anode, cathode and an electrolyte having a metal salt in a nonaqueous solvent comprising:
   the cathode including a crystalline silver vanadium oxide prepared by a chemical addition reaction.

11. An electrochemical cell having a lithium metal anode, a silver vanadium oxide cathode in which the silver vanadium oxide has the nominal formula $Ag_2V_4O_{11}$, and an electrolyte comprising:
   the silver vanadium oxide prepared by a chemical addition reaction according to claims 1,3 or 7 is crystalline.

* * * * *

UNITED STATES PATENT AND TRADEMARK OFFICE
CERTIFICATE OF CORRECTION

PATENT NO. : 5,221,453
DATED : June 22, 1993
INVENTOR(S) : Ann M. Crespi

It is certified that error appears in the above-indentified patent and that said Letters Patent is hereby corrected as shown below:

Column 1, line 61, "ben" should be --been--

Column 3, line 25, "ad" should be --and--

Signed and Sealed this

Eighteenth Day of October, 1994

Attest:

BRUCE LEHMAN

Attesting Officer    Commissioner of Patents and Trademarks